United States Patent
Li et al.

(10) Patent No.: US 9,025,501 B2
(45) Date of Patent: May 5, 2015

(54) METHOD AND DEVICE FOR IMPLEMENTING SYNCHRONIZATION BETWEEN DIFFERENT SYSTEMS

(71) Applicant: Huawei Technologies Co., Ltd., Shenzhen (CN)

(72) Inventors: Li Li, Shenzhen (CN); Zhidong Zhang, Shenzhen (CN); Hui Huang, Shenzhen (CN); Yayong Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 13/742,885

(22) Filed: Jan. 16, 2013

(65) Prior Publication Data

US 2013/0128781 A1 May 23, 2013

Related U.S. Application Data

(63) Continuation of application No. PCT/CN2012/077551, filed on Jun. 26, 2012.

(30) Foreign Application Priority Data

Oct. 27, 2011 (CN) .......................... 2011 1 0331935

(51) Int. Cl.
  *H04J 3/00* (2006.01)
  *H04W 4/00* (2009.01)
  (Continued)

(52) U.S. Cl.
  CPC .......... *H04W 72/0446* (2013.01); *H04W 56/00* (2013.01)

(58) Field of Classification Search
  CPC .................................................. H04W 72/0446

USPC .................................................. 370/330–338
See application file for complete search history.

(56) References Cited

U.S. PATENT DOCUMENTS

| | | | |
|---|---|---|---|
| 2010/0074205 A1* | 3/2010 | Papasakellariou et al. | ... 370/329 |
| 2010/0135272 A1 | 6/2010 | Dayal et al. | |
| 2011/0064043 A1* | 3/2011 | Balachandran et al. | ...... 370/330 |

(Continued)

FOREIGN PATENT DOCUMENTS

| | | |
|---|---|---|
| CN | 101640579 A | 2/2010 |
| CN | 101686465 A | 3/2010 |

(Continued)

OTHER PUBLICATIONS

International Search Report received in International Application No. PCT/CN2012/077551 mailed Oct. 4, 2012, 9 pages.

(Continued)

*Primary Examiner* — Brandon Renner
(74) *Attorney, Agent, or Firm* — Slater & Matsil, L.L.P.

(57) ABSTRACT

The present invention provides a method and a device for implementing synchronization between different systems. The method includes setting a starting time of an LTE TDD frame, where the starting time set for the LTE TDD frame is later than a starting time set for a WiMAX frame. The LTE TDD frame is transmitted after the starting time of the LTE TDD frame arrives. The WiMAX frame adopts a subframe ratio structure of 29:18, the LTE TDD frame adopts a subframe ratio structure of subframe configuration 1, and an UpPTS time slot and a last uplink symbol of a last uplink subframe which are in the LTE TDD frame are in a status of being knocked off.

15 Claims, 5 Drawing Sheets

(51) Int. Cl.
*H04W 72/04* (2009.01)
*H04W 56/00* (2009.01)

(56) References Cited

U.S. PATENT DOCUMENTS

| | | | |
|---|---|---|---|
| 2011/0164604 A1* | 7/2011 | Hao et al. | 370/345 |
| 2012/0014358 A1* | 1/2012 | Pan et al. | 370/336 |
| 2012/0082038 A1* | 4/2012 | Xu et al. | 370/244 |
| 2012/0082070 A1* | 4/2012 | Hart et al. | 370/280 |
| 2012/0113967 A1* | 5/2012 | Smith et al. | 370/338 |
| 2012/0147793 A1* | 6/2012 | Chen et al. | 370/280 |

FOREIGN PATENT DOCUMENTS

| | | |
|---|---|---|
| CN | 101841906 A1 | 9/2010 |
| CN | 102404841 A | 4/2012 |
| WO | WO 2010/065430 A2 | 6/2010 |

OTHER PUBLICATIONS

Written Opinion of the International Searching Authority received in International Application No. PCT/CN2012/077551 mailed Oct. 4, 2012, 20 pages.

First Chinese Office Action received on Application No. 201110331935.4, mailed Aug. 5, 2013, 9 pages.

International Search Report and Written Opinion received in International Application No. PCT/CN2012/077551 mailed Oct. 4, 2012, 11 pages.

* cited by examiner

METHOD AND DEVICE FOR IMPLEMENTING SYNCHRONIZATION BETWEEN DIFFERENT SYSTEMS

This application is a continuation of co-pending International Application No. PCT/CN2012/077551, filed Jun. 26, 2012, which claims priority to Chinese Patent Application No. 201110331935.4, filed Oct. 27, 2011, both of which applications are incorporated herein by reference.

TECHNICAL FIELD

The present invention relates to the field of wireless communications technologies, and in particular, to a method and a device for implementing synchronization between different systems.

BACKGROUND

Long term evolution (Long Term Evolution, LTE) time division duplex (Time Division Duplex, TDD) and worldwide interoperability for microwave access (Worldwide Interoperability for Microwave Access, WiMAX) are both TDD technologies, that is, an uplink and a downlink are distinguished on a single frequency time-domain, and frequency bands used by two systems are overlapped at many places. At present, a WiMAX network already has an extensive commercial storage, while the LTE TDD is also facing commercial uses, and becoming an evolution direction of all TDD cellular systems. Currently, some carriers propose requirements of smooth evolution from an existing WiMAX network to an LTE TDD network, and subsequently, more and more WiMAX carriers will gradually implement this kind of evolution. On one hand, these requirements contribute to the emergence of a WiMAX and LTE TDD dual-mode base station, so as to implement a low-cost steady transition from a WiMAX network to an LTE network; on the other hand, these requirements also contribute to the emergence of a networking scenario with coverage WiWAX and LTE together. Air-interface synchronization between an LTE TDD system and a WiMAX system is needed for sharing a radio frequency unit and an antenna in a dual-mode base station, and the air-interface synchronization is also needed for avoiding mutual interferences during networking with coverage of the two systems.

SUMMARY OF THE INVENTION

The present invention provides a method and a device for implementing synchronization between different systems, for solving a synchronization problem between an LTE TDD system and a WiMAX system.

The present invention provides a method for implementing synchronization between different systems. A starting time of an LTE TDD frame is set. The starting time set for the LTE TDD frame is later than a starting time set for a WiMAX frame. The LTE TDD frame is transmitted after the starting time of the LTE TDD frame arrives. The WiMAX frame adopts a subframe ratio structure of 29:18. The LTE TDD frame adopts a subframe ratio structure of subframe configuration 1, and a UpPTS time slot and a last uplink symbol of a last uplink subframe which are in the LTE TDD frame are in a status of being knocked off.

The present invention provides a device for implementing synchronization between different systems. A setting module is configured to set a starting time of an LTE TDD frame. The starting time set for the LTE TDD frame is later than a starting time set for a WiMAX frame. A transmission module is configured to transmit the LTE TDD frame after the starting time of the LTE TDD frame arrives. The WiMAX frame adopts a subframe ratio structure of 29:18, the LTE TDD frame adopts a subframe ratio structure of subframe configuration 1, and an UpPTS time slot and a last uplink symbol of a last uplink subframe which are in the LTE TDD frame are in a status of being knocked off.

It can be known from the foregoing technical solutions that in the embodiments of the present invention, by processing the LTE TDD frame, synchronization between the WiMAX system and the LTE TDD system may be implemented without affecting performance of the WiMAX system.

BRIEF DESCRIPTION OF THE DRAWINGS

To illustrate technical solutions in embodiments of the present invention or in the prior art more clearly, accompanying drawings required for describing the embodiments or the prior art are introduced briefly in the following. Apparently, the accompanying drawings in the following description merely show some embodiments of the present invention, and persons of ordinary skill in the art can derive other drawings from these accompanying drawings without creative efforts.

DETAILED DESCRIPTION OF ILLUSTRATIVE EMBODIMENTS

To make objectives, technical solutions, and advantages the present invention clearer, technical solutions in the embodiments of the present invention are described clearly and completely in the following with reference to accompanying drawings in the embodiments of the present invention. Apparently, the described embodiments are merely part rather than all of the embodiments of the present invention. All other embodiments obtained by persons of ordinary skill in the art based on the embodiments of the present invention without creative efforts shall fall within the protection scope of the present invention.

Figure 1:
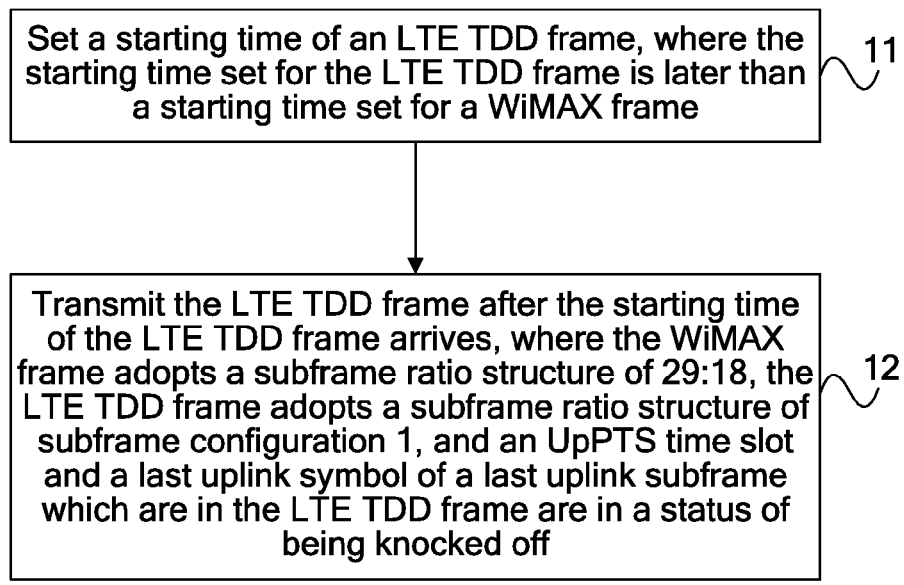
FIG. 1 is a schematic flow chart of a method according to a first embodiment of the present invention.

FIG. 1 is a schematic flow chart of a method according to a first embodiment of the present invention, where the method includes the following steps.

Step 11: Set a starting time of an LTE TDD frame, where the starting time set for the LTE TDD frame is later than a starting time set for a WiMAX frame.

For a dual-mode base station, an LTE system and a WiMAX system share a same set of synchronous clock, the respective starting times of the LTE system and the WiMAX system can be configured at a user interface, so that the LTE system is delayed for set time as compared with the WiMAX system. For an independent networking case, when respective clocks of the LTE TDD system and the WiMAX system are configured, the LTE system may be delayed for a certain period of time as compared with the WiMAX system, that is, the starting time set for the LTE TDD frame is later than the starting time set for the WiMAX frame.

The foregoing certain period of delay time may be any value between 1 ms+5.4125 us and 1 ms+91.67 us.

Step 12: Transmit the LTE TDD frame after the starting time of the LTE TDD frame arrives, where the WiMAX frame adopts a subframe ratio structure of 29:18, the LTE TDD frame adopts a subframe ratio structure of subframe configuration 1, and an UpPTS time slot and a last uplink symbol of a last uplink subframe which are in the LTE TDD frame are in a status of being knocked off.

Specifically, as the WiMAX system is in a stage of large-scale commercial use at present, in order not to affect the WiMAX system, in the embodiment of the present invention, the WiMAX frame are not changed, but the LTE TDD frame is changed so that the LTE TDD frame and the WiMAX frame are synchronized.

In an LTE TDD system, a 10 ms wireless frame is formed by two half frames (Half Frames) with a length of 5 ms, and each half frame is formed by 4 common subframes (subframe) and 1 special subframe with lengths being 1 ms, where a common subframe is formed by two time slots (slot) of 0.5 ms, and the special subframe is formed by three kinds of slots, namely, an uplink pilot time slot (Uplink Pilot Time Slot, UpPTS), a guard period (Guard Period, GP) and a downlink pilot time slot (Downlink Pilot Time Slot, DwPTS). Uplink and downlink configuration proportion of an LTE TDD frame structure is shown in Table 1, where U represents an uplink subframe, D represents a downlink subframe and S represents a special subframe.

TABLE 1

| Uplink configuration and downlink configuration | Switching period from downlink to uplink | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Configuration of the special subframe of the LTE TDD frame is shown in Table 2.

TABLE 2

| Configuration option | Subframe with normal cyclic prefix (OFDM symbol) | | | Subframe with extended cyclic prefix (OFDM symbol) | | |
|---|---|---|---|---|---|---|
| | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | | | |
| 8 | 11 | 1 | 2 | | | |

One frame of the WiMAX system has a length of 5 ms, includes 47 symbols and is divided into two parts, namely, a downlink subframe and an uplink subframe, and generally, a receive/transmit transition gap (Receive/Transmit Transition Gap, RTG) and a transmit/receive transition gap (Transmit/Receive Transition Gap, TTG) are 160 us and 60 us. A first symbol of the downlink subframe is a preamble (Preamble), several subsequent symbols bear a downlink resource allocation indication (Downlink map, DL_MAP) or an uplink resource allocation indication (Uplink map, UL_MAP), and symbols subsequent to them bear data. Table 3 shows a partial schematic diagram of configuration proportion of the uplink subframe to the downlink subframe of the WiMAX system.

TABLE 3

Partial uplink subframe configuration and downlink subframe configuration of WiMAX system (downlink symbol number:uplink symbol number)

| |
|---|
| 35:12 |
| 32:15 |
| 29:18 |
| 26:21 |
| 23:24 |

In the embodiment of the present invention, the WiMAX frame adopts the subframe ratio structure of 29:18 in Table 3, and the LTE TDD adopts the subframe ratio structure of the subframe configuration 1 (that is, DSUUD) in Table 1.

Furthermore, in order to reduce downlink performance loss of the LTE as much as possible, the UpPTS time slot, the GP slot and the DwPTS slot which are included in the special subframe of the LTE TDD frame may adopt a symbol ratio structure of 11:2:1 or 10:2:2 or 12:1:1, and definitely, may also adopt another ratio structure.

Figure 2:
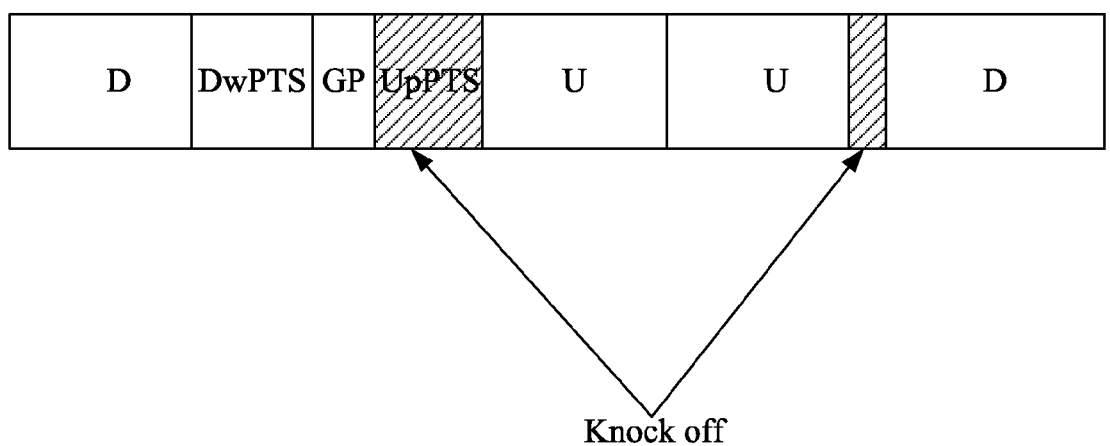
FIG. 2 is a schematic diagram of an LTE TDD frame according to an embodiment of the present invention.

In the foregoing ratio structure, as shown in FIG. 2, comparing the LTE TDD frame provided by the embodiment of the present invention with an existing LTE TDD frame, in the embodiment of the present invention, the UpPTS time slot and the last uplink symbol of the last uplink subframe which are in the LTE TDD frame are in the status of being knocked off. In FIG. 2, filling parts are used to represent the parts which are knocked off.

Figure 3:
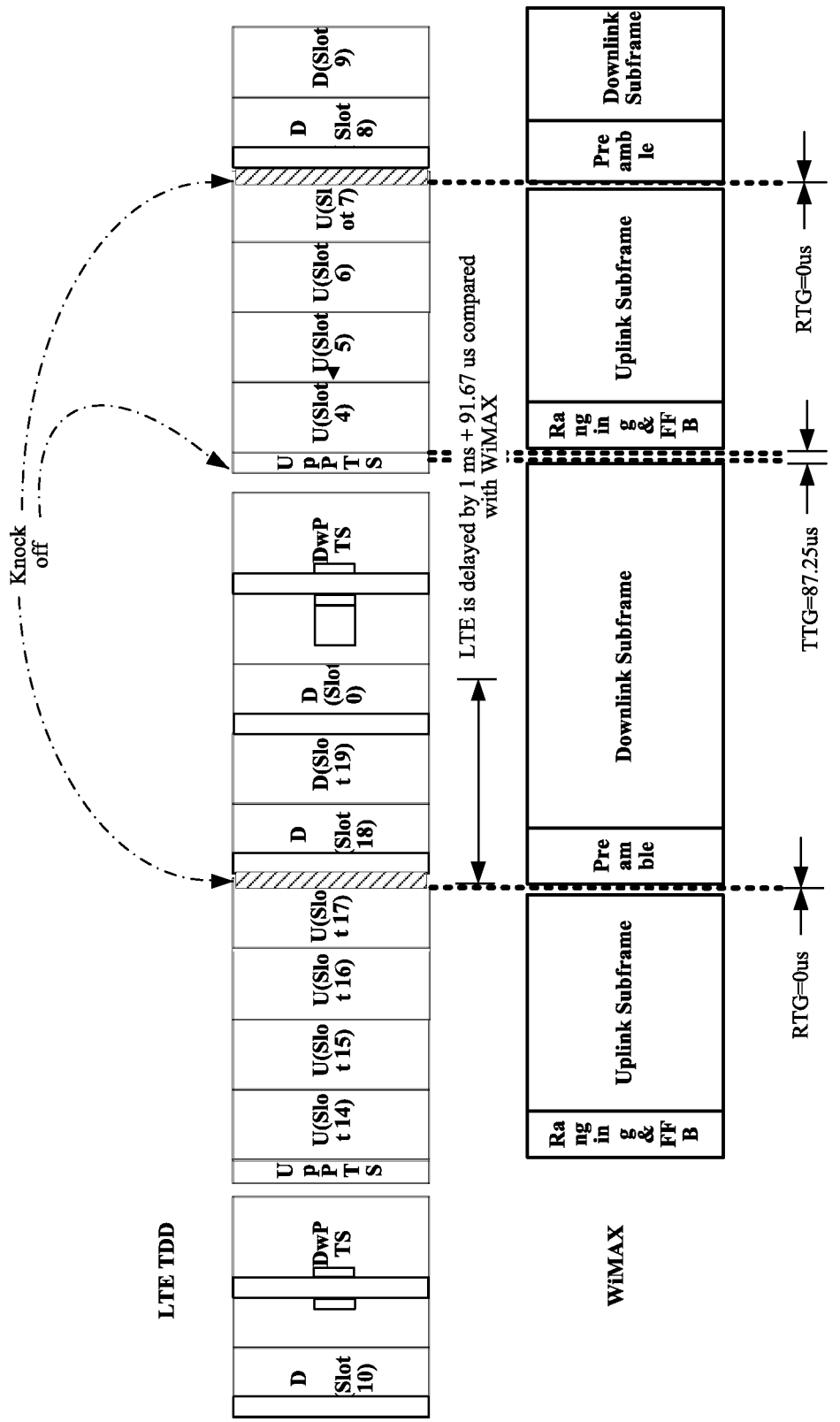
FIG. 3 is a schematic diagram of a transmission time sequence of a WiMAX frame and an LTE TDD frame according to an embodiment of the present invention.
Figure 4:
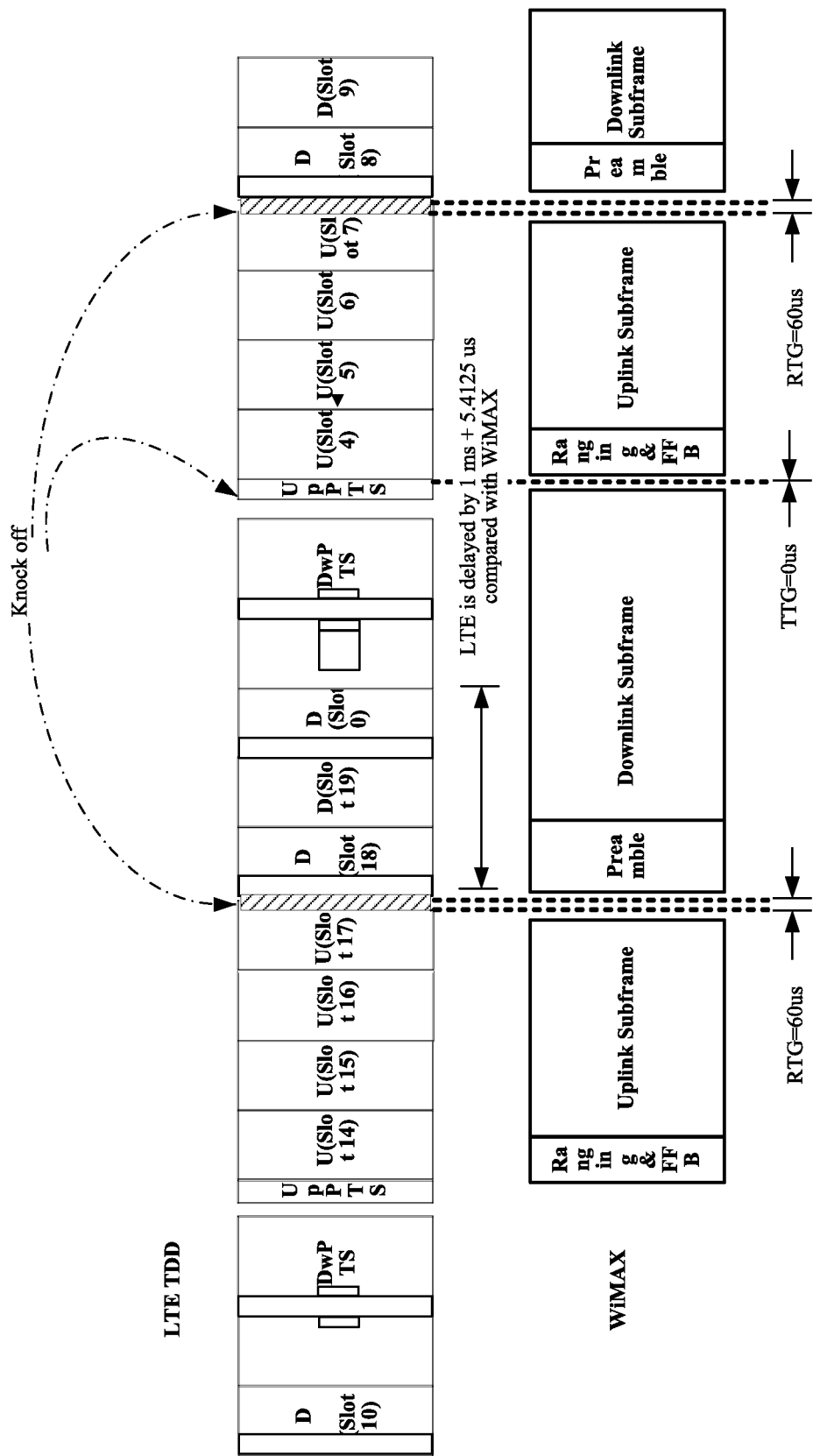
FIG. 4 is another schematic diagram of the transmission time sequence of the WiMAX frame and the LTE TDD frame according to an embodiment of the present invention.

Furthermore, compared with the WiMAX frame, the LTE TDD frame is delayed for a certain period of time in transmission. Two extreme cases are shown in FIG. 3 and FIG. 4. In the two cases, a UpPTS time slot and a last symbol of a last uplink subframe which are in an overlapped part of the LTE TDD frame and the WiMAX frame in a time domain, are in the status of being knocked off.

In FIG. 3, compared with the WiMAX frame, the LTE TDD frame is delayed for 1 ms+91.67 us, and in this case, RTG is 0 us. In FIG. 4, compared with the WiMAX frame, the LTE TDD frame is delayed for 1 ms+5.4125 us, and in this case, TTG is 0 us.

In practice, configuration may be flexible, that is, delay time of the LTE TDD frame compared with the WIMAX frame may be any value from 1 ms+5.4125 us to 1 ms+91.67 us.

In this embodiment, by knocking off part of symbols of the LTE TDD frame, synchronization between the WiMAX system and the LTE TDD system may be implemented, performance of the WiMAX system may be ensured, and an impact on performance of the LTE TDD system may be reduced as much as possible.

In order to implement that the UpPTS time slot and the last symbol of the last uplink subframe are in the status of being knocked off, the following manners may be adopted.

Figure 5:
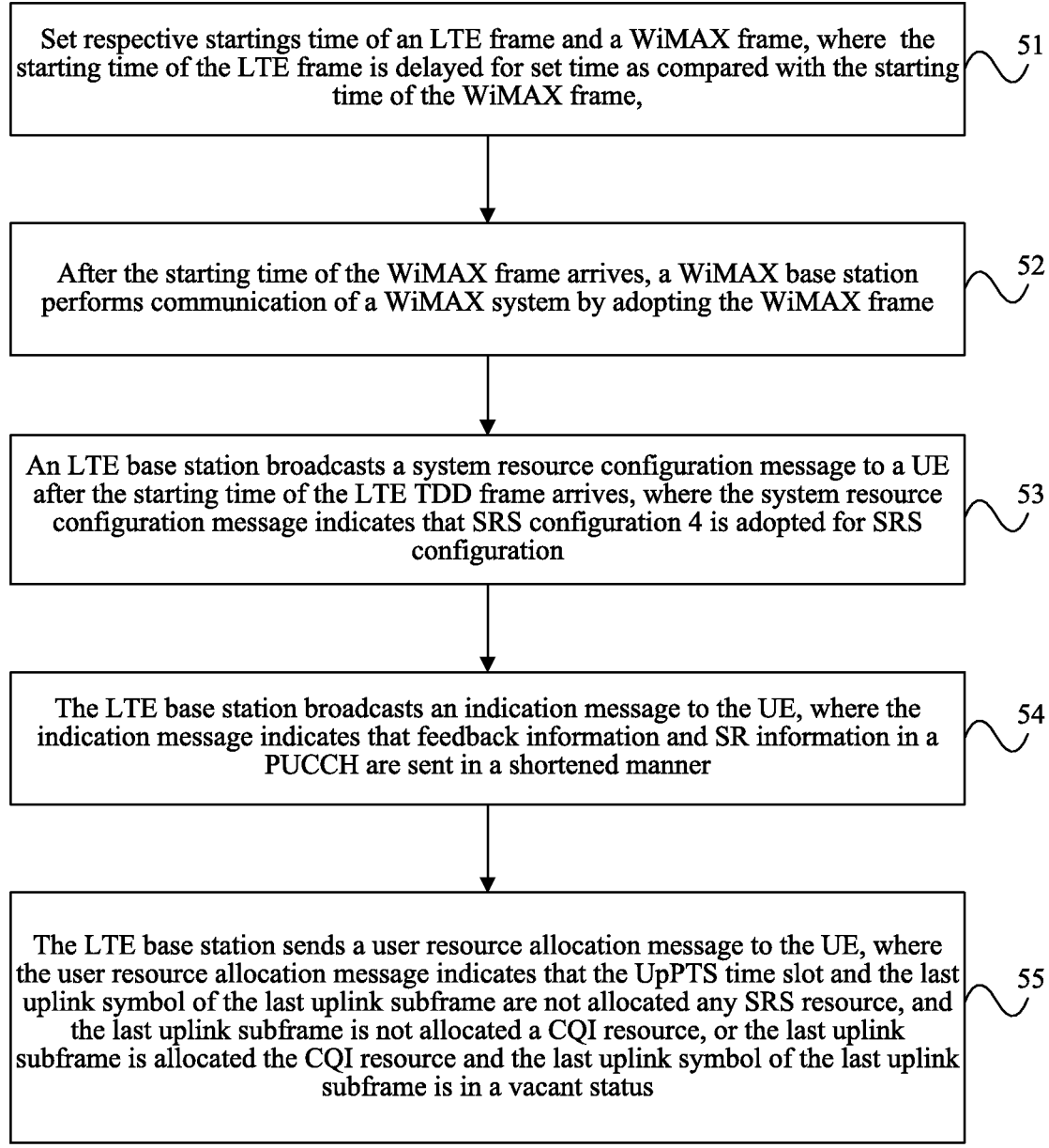
FIG. 5 is a schematic flow chart of a method according to a second embodiment of the present invention.

FIG. 5 is a schematic flow chart of a method according to a second embodiment of the present invention, the method includes the following steps.

Step 51: Set respective starting times of an LTE frame and a WiMAX frame, where the starting time of the LTE frame is delayed for set time as compared with the starting time of the WiMAX frame.

For a dual-mode base station, the two starting times can be set in the dual-mode base station by a user, while for LTE and WiMAX independent networking, starting times may be set in respective systems.

This embodiment takes the LTE and WiMAX independent networking as an example, and in this case, a corresponding LTE system is an LTE base station, and a corresponding WiMAX system is a WiMAX base station. It should be understood that, in a dual-mode base station scenario, the foregoing LTE base station and WiMAX base station may be understood as an LTE module part and a WiMAX module part in the dual-mode base station.

In addition, the set time may be any value between 1 ms+5.4125 us and 1 ms+91.67 us.

Step 52: After the starting time of the WiMAX frame arrives, the WiMAX base station performs communication of the WiMAX system by adopting the WiMAX frame.

The communication of the WiMAX system may be performed by adopting a format of an existing WiMAX frame according to the prior art.

Step 53: The LTE base station broadcasts a system resource configuration message to a user equipment (User Equipment, UE) after the starting time of the LTE TDD frame arrives, where the system resource configuration message indicates that sounding reference signal (Sounding Reference Signal, SRS) configuration 4 is adopted for SRS configuration.

In the embodiment of the present invention, an UpPTS time slot and a last symbol of a last uplink subframe which are in the LTE TDD frame are in a status of being knocked off, and a downlink subframe does not change, and therefore, in this embodiment, the LTE base station may still send downlink information to the UE according to an existing definition given by LTE TDD to the downlink subframe, for example, still send the system resource configuration message on a specified symbol of a specified downlink subframe according to the existing definition. Unlike the prior art, certain limitations need to be imposed on content indicated by some downlink information, for example, the system resource configuration message herein, and an indication message and a user resource allocation message in the following.

Specifically, 16 types of SRS configuration are defined in an LTE protocol, SRS configuration with an index number of 4 may be represented by SRS configuration 4: {1, 2, 3}. The SRS configuration 4 represents that a UpPTS time slot (corresponding to 1), a first uplink subframe (corresponding to 2), a second uplink subframe (corresponding to 3, for LTE TDD frame configuration 1, this is the last uplink subframe) are all configured with an SRS.

In the prior art, the SRS configuration is unfixed, the UpPTS time slot and the last symbol of the last uplink subframe may be configured into SRS resources, and also may not be configured into SRS resources. However, in the embodiment of the present invention, in order to ensure that the UpPTS time slot and the last symbol of the last uplink subframe are in the status of being knocked off, SRS configuration 4 is fixedly adopted, that is, the UpPTS time slot and the last symbol of the last uplink subframe are configured into the SRS resources, so that the UpPTS time slot and the last symbol of the last uplink subframe are not used to transmit data, so as to avoid a data transmission error.

Definitely, during resource configuration of a system level, configuration of a physical uplink control channel (Physical Uplink Control Channel, PUCCH) and so on is further included. The configuration may be implemented by adopting the prior art.

Step 54: The LTE base station broadcasts an indication message to the UE, where the indication message indicates that feedback information and scheduling request (Scheduling Request, SR) information in the PUCCH are sent in a shortened manner.

A PUCCH transmitted in the LTE TDD frame includes semi-static hybrid automatic repeat request (Hybrid Automatic Repeat Request, HARQ) feedback information, scheduling request (Scheduling Request, SR) information and dynamic HARQ feedback information. In an existing protocol specification, the foregoing information may be sent in the shortened manner, and also may not be sent in the shortened manner. When the information is sent in the shortened manner, once a subframe is configured with an SRS resource, feedback information and SR information which correspond to the subframe no longer occupies a last symbol of the subframe. In this embodiment, because the last uplink subframe of the LTE TDD frame is configured with an SRS resource, the last symbol of the last uplink subframe of the LTE TDD frame is no longer occupied when the foregoing information is sent in the shortened manner.

Specifically, the indication message may be an SIB2 broadcast message sent by the LTE base station to the UE, and an ackNackSRS-SimultaneousTransmission subfield in a sounding resource configuration control (SoundingRS-UL-ConfigCommon) field in the SIB2 message is set to TURE, which indicates that the foregoing information is sent in the shortened manner.

Because the feedback information and the SR information may be sent in the shortened manner, shielding during user-level allocation for reducing an impact on the LTE system as much as possible is not necessary, unlike other information in the PUCCH such as channel quality information (Channel Quality Information, CQI).

Step 55: The LTE base station sends a user resource allocation message to the UE, where the user resource allocation message indicates that the UpPTS time slot and the last uplink symbol of the last uplink subframe are not allocated any SRS resource, and the last uplink subframe is not allocated a CQI resource, or the last uplink subframe is allocated the CQI resource and the last uplink symbol of the last uplink subframe is in a vacant status.

After a certain UE accesses the LTE base station, the LTE base station may allocate a resource to the UE, and inform the UE of the corresponding resource through a user resource allocation message.

In the existing protocol specification, after the SRS configuration 4 is adopted, SRS information may be transmitted on the UpPTS time slot and the last symbol of all the uplink subframes, in order to implement that the UpPTS time slot and the last symbol of the last uplink subframe are in the status of being knocked off, in this embodiment, the UpPTS time slot and the last symbol of the last uplink subframe are no longer allocated any SRS resource, and the SRS information is no longer transmitted on the UpPTS time slot and the last symbol of the last uplink subframe.

In the existing protocol specification, the CQI information in the PUCCH is transmitted on all symbols of all uplink subframes. Because the CQI resource is allocated by using a subframe being a unit, in order to reduce an impact on CQI demodulation performance, the last uplink subframe may not be allocated the CQI resource, which includes that the last uplink symbol of the last uplink subframe is not allocated the CQI resource; or the last uplink subframe may be allocated the CQI resource, but it needs to be ensured that the last uplink symbol of the last uplink subframe is in the vacant status. During implementation of the vacant status, configuration may be performed at a physical layer, so that at the physical layer, no signal is sent on the last uplink symbol of the last uplink subframe.

In addition, that the last uplink subframe is allocated the CQI resource and the last symbol of the last uplink subframe is in the vacant status may be understood as follows: the CQI resource may be allocated to the subframe corresponding to the knocked off symbol, and however, because a last symbol corresponding to a resource allocated to CQI needs to be knocked off, the last uplink symbol of the last uplink subframe corresponding to the CQI is vacant.

After processing in steps 53 to 55, for the UpPTS time slot and the last symbol of the last uplink subframe which are in the LTE TDD frame, the LTE base station no longer allocates resource to them, and the LTE base station informs the UE of not using them, that is, the UpPTS time slot and the last symbol of the last uplink subframe which are in the LTE TDD frame are in the status of being knocked off. After the UpPTS time slot and the last symbol of the last uplink subframe which are in the LTE TDD frame are in the status of being knocked off, a transmitter does not transmit any data throughout a whole frequency domain of the UpPTS time slot and the last symbol of the last uplink subframe, which can be understood as that the transmitter directly cuts off, in terms of time, the UpPTS time slot and the last symbol of the last uplink subframe which are in the LTE TDD frame.

After knocking off the UpPTS time slot and the last symbol of the last uplink subframe, a base station and a terminal of the LTE TDD system may transmit the LTE TDD frame according to a format of the LTE TDD frame in which the symbol is knocked off. By this time, the LTE TDD system may be synchronized with the WiMAX system.

In this status, uplinks and downlinks of the WiMAX system and the LTE TDD system are synchronized, so that the LTE TDD system and the WiMAX system may share a radio frequency unit and an antenna in a dual-mode base station, or may avoid mutual interferences during networking with coverage of the two systems.

The foregoing set time may be any time between the two extreme cases shown in FIG. 3 and FIG. 4.

In the embodiment of the present invention, the synchronization between the LTE TDD system and the WiMAX system is implemented, enough time may be provided for receive/transmit transition and transmit/receive transition of an RRU radio frequency channel, so that a dual mode where the LTE TDD system and the WiMAX system share a same RRU may be implemented; it is ensured that uplink and downlink mutual interferences between the two systems are avoided when the two systems performs independent networking by adopting a co-frequency or adjacent frequency co-coverage area, so as to implement networking coexistence; it is ensured that a service of the WiMAX system suffers no performance loss, which protects existing investment of a WiMAX carrier; and it is ensured that the LTE system only loses part of a user number scale and a little uplink throughput.

Figure 6:
FIG. 6 is a schematic structural diagram of a device according to a third embodiment of the present invention.

FIG. 6 is a schematic structural diagram of a device according to a third embodiment of the present invention. The device is a device for executing the foregoing method, and the device may be an LTE base station, or an LTE module part in a dual-mode base station, or a UE in an LTE system. The device includes a setting module 61 and a transmission module 62; the setting module 61 is configured to set a starting time of an LTE TDD frame, where the starting time set for the LTE TDD frame is later than a starting time set for a WiMAX frame; the transmission module 62 is configured to transmit the LTE TDD frame after the starting time of the LTE TDD frame arrives, where the WiMAX frame adopts a subframe ratio structure of 29:18, the LTE TDD frame adopts a subframe ratio structure of subframe configuration 1, and an UpPTS time slot and a last uplink symbol of a last uplink subframe which are in the LTE TDD frame are in a status of being knocked off.

In an embodiment, if the device is on a base station side, the device may further include a knocking-off module. The knocking-off module is configured to broadcast a system resource configuration message, where the system resource configuration message indicates that SRS configuration 4 is adopted, so that the UpPTS time slot and the last uplink symbol of the last uplink subframe are configured into SRS resources.

In an embodiment, the knocking-off module is configured to send a user resource allocation message by adopting the LTE TDD frame, where the user resource allocation message indicates that the UpPTS time slot and the last uplink symbol of the last uplink subframe are not allocated any SRS resource, and the last uplink subframe is not allocated a CQI resource, or the last uplink subframe is allocated the CQI resource and the last uplink symbol of the last uplink subframe is in a vacant status.

In an embodiment, the knocking-off module is configured to broadcast an indication message by adopting the LTE TDD frame, where the indication message indicates that it is configured that semi-static HARQ feedback information, SR information and dynamic HARQ feedback information which are transmitted in the LTE TDD frame are sent in a shortened manner.

Furthermore, the knocking-off module may be configured to broadcast an SIB2 message, where a channel resource configuration control field in the SIB2 message is configured into an indication of sending in the shortened manner.

A difference between the starting time set for the LTE TDD frame and the starting time set for the WiMAX frame is any value between 1 ms+5.4125 us and 1 ms+91.67 us.

In this embodiment, by knocking off part of symbols of the LTE TDD frame, synchronization between the WiMAX system and the LTE TDD system may be implemented, performance of the WiMAX system may be ensured, and an impact on the performances of the LTE TDD system may be reduced as much as possible.

Persons of ordinary skill in the art can understand that all or part of the steps of the foregoing method embodiments may be completed by a program instructing relevant hardware.

The program may be stored in a computer readable storage medium. When the program runs, the above steps of the methods in the embodiments are performed. The storage medium includes various media capable of storing program codes, such as a ROM, a RAM, a magnetic disk, or an optical disk.

Finally, it should be noted that the foregoing embodiments are merely used for describing the technical solutions of the present invention, but not intended to limiting the present invention. Although the present invention is illustrated in detail with reference to the foregoing embodiments, persons of ordinary skill in the art should understood that they can still make modifications to the technical solutions described in the foregoing embodiments, or make equivalent substitutions to some technical features of the technical solutions; such modifications or equivalent substitutions do not make essence of corresponding technical solutions depart from the scope of the technical solutions of the embodiments of the present invention.

What is claimed is:

1. A method for implementing synchronization between different systems, the different systems refer to a worldwide interoperability for microwave access (WiMAX) system and a long term evolution time division duplex (LTE TDD) system, wherein a starting time set for an LTE TDD frame is later than a starting time set for a WiMAX frame, the method comprising:

transmitting the LTE TDD frame after the starting time of the LTE TDD frame arrives, wherein the WiMAX frame adopts a subframe ratio structure of 29:18, the LTE TDD frame adopts a subframe ratio structure of subframe configuration 1, and an uplink pilot time slot and a last uplink symbol of a last uplink subframe that are in the LTE TDD frame are in a status of being knocked off; and sending a user resource allocation message, wherein the user resource allocation message indicates that the uplink pilot time slot and the last uplink symbol of the last uplink subframe are not allocated any sounding reference signal (SRS) resource and the last uplink subframe is allocated the channel quality information (CQI) resource and the last uplink symbol of the last uplink subframe is in a vacant status.

2. The method according to claim 1, further comprising broadcasting a system resource configuration message, wherein the system resource configuration message indicates that SRS configuration 4 is adopted, so that the uplink pilot time slot and the last uplink symbol of the last uplink subframe are configured into SRS resources.

3. The method according to claim 1, further comprising broadcasting an indication message, wherein the indication message indicates a configuration for semi-static hybrid automatic repeat request (HARQ) feedback information and wherein scheduling request (SR) information and dynamic HARQ feedback information that are transmitted in the LTE TDD frame are sent in a shortened manner.

4. The method according to claim 3, wherein the broadcasting the indication message comprises broadcasting an SIB2 message, wherein a channel resource configuration control field in the SIB2 message is configured into an indication of sending in the shortened manner.

5. The method according to claim 1, wherein a difference between the starting time set for the LTE TDD frame and the starting time set for the WiMAX frame is any value between 1 ms+5.4125 us and 1 ms+91.67 us.

6. A device for implementing synchronization between a worldwide interoperability for microwave access (WiMAX) system and a long term evolution time division duplex (LTE TDD) system, wherein a starting time set for a LTE TDD frame is later than a starting time set for a WiMAX frame, the device comprising:

a transmitter, configured to transmit the LTE TDD frame after the starting time of the LTE TDD frame arrives, wherein the WiMAX frame adopts a subframe ratio structure of 29:18, the LTE TDD frame adopts a subframe ratio structure of subframe configuration 1, and an uplink pilot time slot and a last uplink symbol of a last uplink subframe that are in the LTE TDD frame are in a status of being knocked off;

wherein the transmitter is further configured to send a user resource allocation message, wherein the user resource allocation message indicates that the uplink pilot time slot and the last uplink symbol of the last uplink subframe are not allocated any sounding reference signal (SRS) resource, and the last uplink subframe is allocated the channel quality information (CQI) resource and the last uplink symbol of the last uplink subframe is in a vacant status.

7. The device according to claim 6, wherein the transmitter is further configured to broadcast a system resource configuration message, wherein the system resource configuration message indicates that SRS configuration 4 is adopted, so that the uplink pilot time slot and the last uplink symbol of the last uplink subframe are configured into SRS resources.

8. The device according to claim 6, wherein the transmitter is further configured to broadcast an indication message, wherein the indication message indicates that it is configured that semi-static hybrid automatic repeat request (HARQ) feedback information, scheduling request (SR) information and dynamic HARQ feedback information that are transmitted in the LTE TDD frame are sent in a shortened manner.

9. The device according to claim 8, wherein the transmitter is further configured to broadcast an SIB2 message, wherein a channel resource configuration control field in the SIB2 message is configured into an indication of sending in the shortened manner.

10. The device according to claim 6, wherein a difference between the starting time set for the LTE TDD frame and the starting time set for the WiMAX frame is any value between 1 ms+5.4125 us and 1 ms+91.67 us.

11. A device for implementing synchronization between a worldwide interoperability for microwave access (WiMAX) system and a long term evolution time division duplex (LTE TDD) system, wherein a starting time set for an LTE TDD frame is later than a starting time set for a WiMAX frame, the device comprising:

a processor; and a computer-readable storage medium storing a program to be executed by the processor, the program including instructions for:

transmitting the LTE TDD frame after the starting time of the LTE TDD frame arrives, wherein the WiMAX frame adopts a subframe ratio structure of 29:18, the LTE TDD frame adopts a subframe ratio structure of subframe configuration 1, and an uplink pilot time slot and a last uplink symbol of a last uplink subframe that are in the LTE TDD frame are in a status of being knocked off; and sending a user resource allocation message, wherein the user resource allocation message indicates that the uplink pilot time slot and the last uplink symbol of the last uplink subframe are not allocated any sounding reference signal (SRS) resource and the last uplink subframe is allocated the channel quality information (CQI) resource and the last uplink symbol of the last uplink subframe is in a vacant status.

12. The device according to claim 11, wherein the program includes further instructions for broadcasting a system resource configuration message, wherein the system resource configuration message indicates that SRS configuration 4 is adopted, so that the uplink pilot time slot and the last uplink symbol of the last uplink subframe are configured into SRS resources.

13. The device according to claim 11, wherein the program includes further instructions for broadcasting an indication message, wherein the indication message indicates that it is configured that semi-static hybrid automatic repeat request (HARQ) feedback information, scheduling request (SR) information and dynamic HARQ feedback information that are transmitted in the LTE TDD frame are sent in a shortened manner.

14. The device according to claim 13, wherein the transmitter is further configured to broadcast an SIB2 message, wherein a channel resource configuration control field in the SIB2 message is configured into an indication of sending in the shortened manner.

15. The device according to claim 11, wherein a difference between the starting time set for the LTE TDD frame and the starting time set for the WiMAX frame is any value between 1 ms+5.4125 us and 1 ms+91.67 us.

* * * * *